(12) United States Patent
Ueno

(10) Patent No.: US 7,848,867 B2
(45) Date of Patent: Dec. 7, 2010

(54) COASTING DECELERATION CONTROL FOR A VEHICLE

(75) Inventor: Munetoshi Ueno, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 878 days.

(21) Appl. No.: 11/642,485

(22) Filed: Dec. 20, 2006

(65) Prior Publication Data

US 2007/0173372 A1  Jul. 26, 2007

(30) Foreign Application Priority Data

Dec. 21, 2005  (JP) .............................. 2005-367836

(51) Int. Cl.
*B60K 1/02* (2006.01)
*G60F 7/60* (2006.01)

(52) U.S. Cl. ............................ 701/70; 701/48; 701/54; 701/60; 701/84; 180/65.21; 477/47; 477/119; 318/363; 318/743

(58) Field of Classification Search .................. 701/48, 701/54, 61, 70, 84; 180/65.21; 477/47, 119; 318/363, 743
See application file for complete search history.

(56) References Cited

U.S. PATENT DOCUMENTS

| | | | | |
|---|---|---|---|---|
| 5,287,773 | A * | 2/1994 | Nakawaki et al. .............. | 477/92 |
| 5,586,953 | A * | 12/1996 | Abo .............................. | 477/47 |
| 5,915,801 | A * | 6/1999 | Taga et al. ................... | 303/152 |
| 5,921,641 | A * | 7/1999 | Lupges et al. ................ | 303/191 |
| 6,009,365 | A * | 12/1999 | Takahara et al. ............... | 701/54 |
| 6,223,118 | B1 * | 4/2001 | Kobayashi et al. ............. | 701/96 |
| 6,378,636 | B1 | 4/2002 | Worrel | |
| 6,474,753 | B1 * | 11/2002 | Rieth et al. .................. | 303/191 |
| 6,543,565 | B1 * | 4/2003 | Phillips et al. ............... | 180/165 |
| 6,719,076 | B1 | 4/2004 | Tabata et al. | |
| 2002/0167221 | A1 | 11/2002 | Kosik et al. | |
| 2005/0046272 | A1 * | 3/2005 | Rieth et al. ............... | 303/113.4 |
| 2006/0064225 | A1 * | 3/2006 | Tabata et al. ................... | 701/96 |
| 2008/0238075 | A1 * | 10/2008 | Bullinger et al. ............. | 280/806 |
| 2009/0048746 | A1 * | 2/2009 | Kaigawa ....................... | 701/54 |

FOREIGN PATENT DOCUMENTS

| | | |
|---|---|---|
| DE | 19734567 | 1/1999 |
| DE | 19734567 A1 * | 1/1999 |
| EP | 0754588 | 1/1997 |

(Continued)

OTHER PUBLICATIONS

Office Action in Korean Patent Application No. 10-2006-130496, dated Mar. 4, 2009 and English translation thereof (6 pages).

(Continued)

*Primary Examiner*—Thomas G Black
*Assistant Examiner*—Lin B Olsen
(74) *Attorney, Agent, or Firm*—Osha Liang LLP

(57) ABSTRACT

A vehicle coasting deceleration control system has a motor/generator arranged in a drive-train of a vehicle. A controller is configured to determine a driver demand regarding deceleration of the vehicle at a time of coasting accompanied by an accelerator releasing operation. The controller is further configured to control the motor/generator to decelerate the vehicle according to the determined driver demand regarding deceleration.

21 Claims, 8 Drawing Sheets

FOREIGN PATENT DOCUMENTS

| | | |
|---|---|---|
| EP | 0933246 | 8/1999 |
| EP | 1160119 | 12/2001 |
| JP | 05191904 | 7/1993 |
| JP | 09-037407 A | 2/1997 |
| JP | 11-191903 A | 7/1999 |
| JP | 2000224713 | 8/2000 |
| JP | 2003-074682 | 3/2003 |

OTHER PUBLICATIONS

English Patent Abstract of JP2000224713 from esp@cenet, published Aug. 11, 200 (1 page).

English Patent Abstract of DE19734567 from esp@cenet, Published Jan. 21, 1999 (1 page).

English Patent Abstract of JP5191904 from esp@cenet, Published Jul. 30, 1993 (1 page).

European Search Report for Patent Application No. 06126670.6, dated Jun. 4, 2009 (7 pages).

English Patent Abstract of JP09037407 from esp@cenet, Published Feb. 7, 1997 (1 page).

English Patent Abstract of JP11191903 from esp@cenet, Published Jul. 13, 1999 (1 page).

Office Action in European Patent Application No. 06126670.6-1264, dated Sep. 9, 2010 (5 pages).

* cited by examiner

COASTING DECELERATION CONTROL FOR A VEHICLE

CROSS-REFERENCE TO RELATED APPLICATIONS

This application claims priority to Japanese Patent Application No. 2005-367836, filed on Dec. 21, 2005. The entire disclosure of Japanese Patent Application No. 2005-367836 is hereby incorporated herein by reference.

BACKGROUND OF INVENTION

1. Field of the Invention

The present invention generally relates to vehicles, and more particularly to a coasting deceleration control device and process for a vehicle having a driving system with a motor/generator and a transmission.

2. Background Art

In an automotive vehicle equipped with an ordinary automatic transmission having a plurality of gear ratio steps, coasting deceleration is affected by the amount of engine friction depending upon the accelerator position or whether braking is applied. Further, the engine friction can change depending on the number of revolutions of the engine that may be a function of the rotating speed of the engine or engine revolutions per minute (RPM). Shifting from a higher gear to a lower gear so that the engine rotates faster for the same speed of the wheels, is often referred to as down shifting. Further, the amount of force transmitted to a rear end portion of the transmission due to friction varies depending on the transmission gear ratio that is determined according to a shift schedule or a down shift schedule in the case of coasting deceleration.

Generally, coasting deceleration of a vehicle equipped with a stepped transmission is predetermined when the vehicle is designed. Accordingly, the range of coasting deceleration cannot be adjusted to satisfy various driving conditions. For example, if a driver feels that the coasting vehicle is decelerating too slowly, then the driver may downshift or use a lower gear range or deactivate an overdrive in order to increase the amount of coasting deceleration. However, it is difficult to for an ordinary automatic transmission to always perform provide coasting deceleration at a desired rate.

A vehicle equipped with a CVT (Continuously Variable Transmission) can very quickly detect the driver's intent to decelerate and can change a transmission gear ratio of the CVT, thereby adjusting the coasting deceleration to a desired level of drivability. Such features are exemplified in Japanese Patent Laid-Open Application No. 2003-74682, for example.

SUMMARY OF INVENTION

In an automotive vehicle equipped with a CVT, the amount of coasting deceleration cannot be adjusted in a wide range by only controlling transmission input speed through changing the selected transmission gear ratio. Therefore, regardless of whether a driver manually controls coasting deceleration by down shifting, if a target transmission gear ratio exceeds an allowable transmission gear ratio (a threshold value), then it is difficult to obtain a desired down shift and thus a desired coasting deceleration quickly enough to satisfy the user's demand.

One or more embodiments of a coasting deceleration control device for a vehicle are disclosed that can adjust coasting deceleration according to a driver's demand for deceleration when a vehicle is coasting as may be determined by the driver releasing the accelerator pedal. In one embodiment the coasting deceleration may be controlled by controlling coasting down shifting of the CVT to rotate the engine at a higher rate when the accelerator pedal is released. Thus, at the time of coasting (that is, when the vehicle is moving) accompanied by an accelerator releasing operation, the driver's demand for deceleration or the driver's intended rate of deceleration (hereinafter referred to as "driver intent for deceleration") may be determined. In one embodiment, the determination of the driver intent for deceleration may be used to control either or both the engine gear ratio and the amount of torque applied by the vehicle engine to a motor/generator. It will be understood that "the time of coasting" as used herein means any period of time when the vehicle is moving but is not being propelled by the power of an engine. Also, the time of coasting accompanied by "an accelerator releasing operation" means that the coasting is accompanied by the driver releasing the accelerator to a closed position, as for example by lifting the driver's foot off of an accelerator pedal so that coasting acceleration or coasting deceleration due to the frictional power loss from engine rotation results or is intended to result.

In one or more embodiments a coasting deceleration control device is disclosed for a vehicle having a driving system with a motor/generator and a transmission. The coasting deceleration control device may include a target coasting deceleration computing means that determines whether a driver's demand for deceleration is strong or weak at the time of coasting accompanied by an accelerator releasing operation. Such computing means can then calculate and set a target coasting deceleration. The magnitude of the deceleration may be set to a small value if the driver's demand is small, to large value if the driver's demand for deceleration is strong, and the target deceleration value may be set to a value within a range from small to large depending upon the level of driver demand determined. Thus, the larger the determined driver demand, the larger the target deceleration. The coasting deceleration control device may also include a coasting deceleration control means that uses a torque control of the motor/generator engaged to the engine rotation to adjust the target coasting deceleration calculated by the target coasting deceleration computing means.

Accordingly, the target coasting deceleration computing means determines whether the driver's demand for deceleration is strong or weak at the time of coasting accompanied by the accelerator releasing operation. Such computing means then calculates the target coasting deceleration by using a larger value as the driver's demand for deceleration is determined to be stronger. The coasting deceleration control means adjusts the target coasting deceleration calculated by the target coasting deceleration computing means by using the motor/generator torque control. Particularly, at the time of coasting accompanied by the accelerator releasing operation, the coasting deceleration of the vehicle might be determined based solely upon a magnitude of brake torque of the driving system. The brake torque is determined based on a difference between an input torque from driving wheels and a torque of an output shaft of the transmission. However, such coasting deceleration does not reflect the level of driver demand for deceleration. It has been found by the inventor that driver demand for deceleration may be recognized by detecting the driver's operation of the accelerator and/or the brake. Thus, by for example by detecting the driver's rate of moving from the accelerator on to braking on the driver demand can be calculated and deceleration may be usefully adjusted according to the level of driver's demand for deceleration. For example, a vehicle equipped with a CVT can adjust the coasting deceleration caused by the engine friction through changing a transmission gear ratio of the CVT to a certain degree. However, the maximum adjustment obtainable is limited to the difference output torque at the lowest gear ratio and the highest gear ratio of the transmission. Thus, the adjustable range of coasting deceleration by changing only the transmission gear ratio is limited. In a vehicle equipped with a motor/generator in the driving system, a degree of freedom for controlling the motor/generator torque can be adjusted in a wide range and a suitable control response can be obtained. Thus, a motor/generator torque control may be employed so that the entire demand for coasting deceleration is provided by the motor/generator or so that the coasting deceleration adjusting value can be adjusted to compensate for limits in the coasting deceleration provided by the transmission shift. Accordingly, the coasting deceleration can be adjusted according to the level of a driver's demand for deceleration. As a result, at the time of coasting accompanied by the accelerator releasing operation, the coasting deceleration can be adjusted according to the level of a driver's demand for deceleration, thereby improving the driving performance.

In one embodiment the driver's demand for deceleration of the vehicle, is determined based upon how fast the driver moves from releasing the accelerator to applying the brakes. A shorter time may be considered as a higher demand for deceleration. In other embodiments the multiple operations and rates of operations of the accelerator and the brake together with the timing between accelerator and brake operations can be used to determine the driver demand for deceleration. Other aspects and usefulness of various embodiments of the invention will be apparent from the following description and the appended claims.

DETAILED DESCRIPTION

Figure 1:
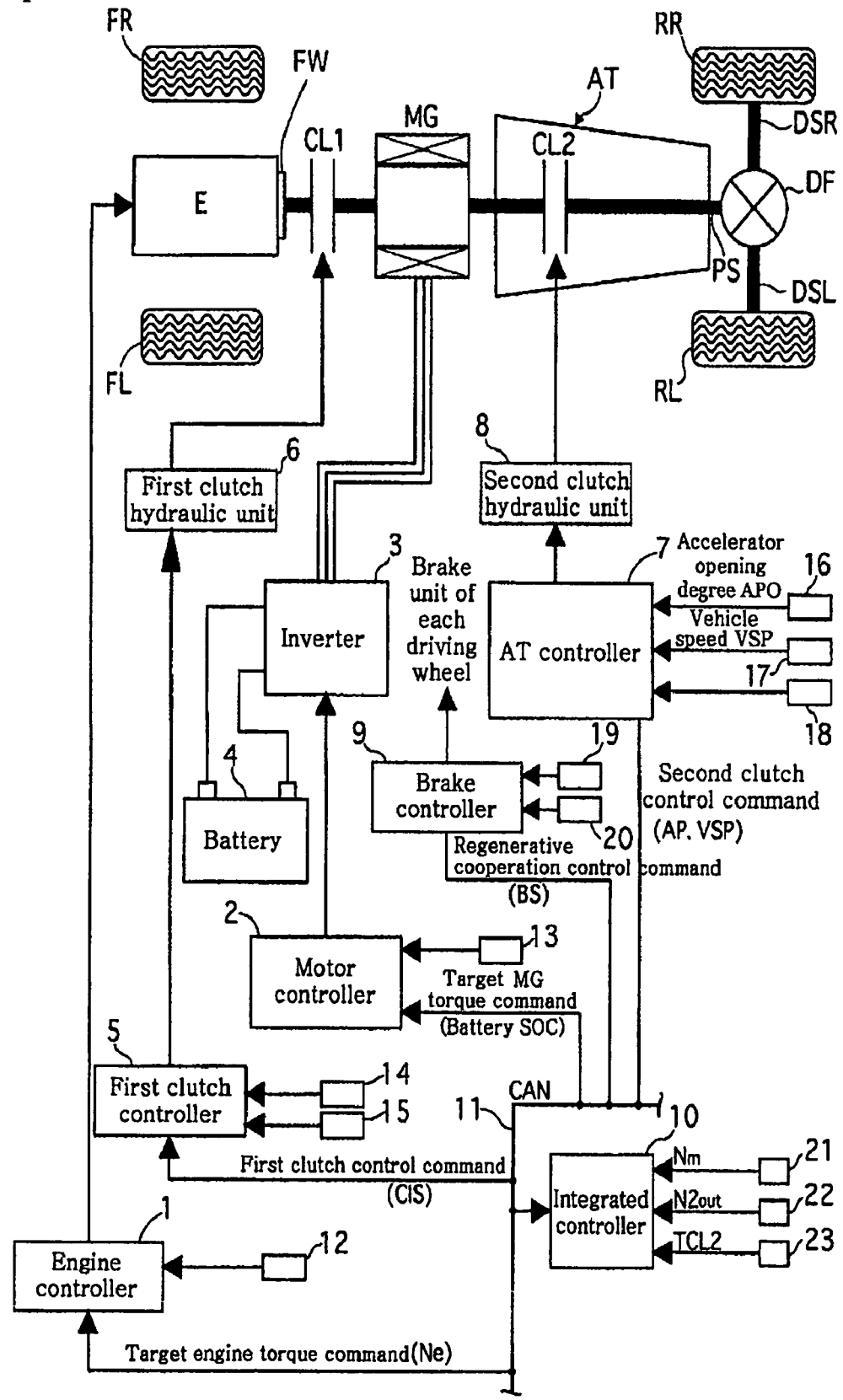
FIG. 1 is a schematic system view showing a rear-wheel drive hybrid vehicle equipped with a coasting deceleration control device according to one or more embodiments of the present invention.

Exemplary embodiments of the invention will be described with reference to the accompanying figures. Like items in the figures are shown with the same reference numbers.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Hereinafter, the embodiments of the present invention will be described with reference to the accompanying drawings. In the drawings described hereinafter, identical reference numerals will be used for the corresponding parts having substantially same functions and configurations, and their redundant explanations will be omitted herein.

[Driving System and Control System of a Hybrid Vehicle]

FIG. 1 shows a schematic view of an example of a rear-wheel drive hybrid vehicle that is equipped with a coasting deceleration control device according to one or more embodiments of the present invention. As shown in FIG. 1, a drivetrain of the hybrid vehicle includes an engine E, a flywheel FW, a first clutch CL1, a motor/generator MG, a second clutch CL2, an automatic transmission AT, a propeller shaft PS, a differential DF, a left drive shaft DSL, a right drive shaft DSR, a left rear wheel RL, a right rear wheel RR, a left front wheel FL, and a right front wheel FR.

For example, the engine E may be a gasoline engine or a diesel engine. The throttle valve opening is controlled according to a control command from an engine controller 1 (which will be described later). The flywheel FW is connected to an output shaft of the engine E.

The first clutch CL1 is disposed between the engine E and the motor/generator MG. The operation of the first clutch CL1, including operation of a slip-engagement and a slip-release is controlled based on a control hydraulic pressure generated at a first clutch hydraulic unit 6 according to a control command from a first clutch controller 5 (which will be described later).

For example, the motor/generator MG may be a synchronous motor/generator. Such a motor/generator MG includes a rotor to which a permanent magnet is fixed. The motor/generator MG also includes a stator around which a coil is wound. The motor/generator MG is controlled by three-phase alternating current generated at an inverter 3, which is received according to a control command from a motor controller 2 (which will be described later). The motor/generator MG may operate as a motor driven by power supplied from a battery 4. Alternatively, the motor/generator MG may operate as a generator, which generates an electromotive force at both ends of the stator coil to charge the battery 4. The rotor of the motor/generator MG is connected to an input shaft of the automatic transmission AT. In the embodiment the connection of the rotor to the input shift may be through a damper (not shown).

The second clutch CL2 is disposed between the motor/generator MG and drive wheels, shown in this embodiment as the left and right rear wheels RL and RR. The operation of the second clutch CL2, including slip-engagement and slip-release, is controlled based on a control hydraulic pressure generated at a second clutch hydraulic unit 8 according to a control command from an automatic transmission controller 7 (which will be described later).

For example, the automatic transmission AT may be a stepped transmission having 5-speed forward and 1-speed reverse, in which a gear-shift can be automatically performed based on the vehicle speed or in connection with the accelerator opening. The second clutch CL2 is an element that is not separable from the others, but is optimally selected from multiple clutches coupled to the respective shift stages of the automatic transmission AT. An output shaft of the automatic transmission AT is connected to the left and right rear wheels RL and RR through the propeller shaft PS, differential DF, left drive shaft DSL and right drive shaft DSR.

Wet multi-disk clutches which can continuously control an oil flow rate and a hydraulic pressure in a proportional solenoid, may be used as the first and second clutches CL1 and CL2. The hybrid driving system operates in one of two driving modes depending on whether the first clutch CL1 is in the engagement state or in the release state. When the first clutch CL1 is in the release state, the hybrid driving system operates in an electric vehicle driving mode ("EV mode"), wherein the vehicle is driven only by the power of the motor/generator MG. On the other hand, when both the first clutch CL1 and the second clutch CL2 are in the engagement state, the hybrid driving system operates in a hybrid electric vehicle driving mode ("HEV mode"), wherein the vehicle is driven by both the power of the engine E and the motor/generator MG.

A control system of the hybrid vehicle according to one or more embodiments of the present invention will now be discussed with reference to FIG. 1.

As shown in FIG. 1, a control system of the hybrid vehicle includes an engine controller 1, a motor controller 2, an inverter 3, a battery 4, a first clutch controller 5, a first clutch hydraulic unit 6, an automatic transmission controller 7, a second clutch hydraulic unit 8, a brake controller 9 and an integrated controller 10. The engine controller 1, motor controller 2, first clutch controller 5, automatic transmission controller 7, brake controller 9 and integrated controller 10 are connected to each other through control area network ("CAN") communication lines 11 for exchanging information therebetween.

The engine controller 1 receives information regarding the number of revolutions of the engine E from an engine RPM sensor 12 and outputs a command for controlling engine operating points Ne and Te to, for example, a throttle valve actuator (not shown) in response to a target engine torque command from the integrated controller 10. The information regarding the number of revolutions Ne of the engine E is then transmitted to the integrated controller 10 through the CAN communication lines 11.

The motor controller 2 receives the information from a resolver 13, which detects a rotating position of the rotor of the motor/generator MG. The motor controller 2 then outputs a command for controlling motor operating points Nm and Tm of the motor/generator MG to the inverter 3 in response to a target motor/generator torque command from the integrated controller 10. The motor controller 2 monitors a battery state of charge ("SOC"). The information regarding the SOC is used for controlling the motor/generator MG and is transmitted to the integrated controller 10 through the CAN communication lines 11.

The first clutch controller 5 receives the detected information from a first clutch hydraulic sensor 14 and a second clutch hydraulic sensor 15. It then outputs a command for controlling an engagement/release of the first clutch CL1 to the first clutch hydraulic unit 6 in response to a first clutch control command from the integrated controller 10. Information regarding a first clutch stroke C1S is transmitted to the integrated controller 10 through the CAN communication lines 11.

The automatic transmission controller 7 receives the detected information from an accelerator opening sensor 16, speed sensor 17 and second clutch hydraulic sensor 18. It then outputs a command for controlling an engagement/release of the second clutch CL2 to the second clutch hydraulic unit 8 in an automatic transmission hydraulic control valve in response to a second clutch control command from the integrated controller 10. Information regarding an accelerator opening APO and a vehicle speed VSP is transmitted to the integrated controller 10 through the CAN communication lines 11.

The brake controller 9 receives the detected information from a wheel speed sensor 19, which detects the speed of each of the four wheels, and a brake stroke sensor 20. For example, a braking operation force required to press a brake, or brake stroke ("BS"), may not be satisfied with a regenerative braking force. The brake controller 9 performs a regenerative cooperative brake control in response to a regenerative cooperative control command from the integrated controller 10 so as to compensate for the shortage of the regenerative braking force with a mechanical braking force (a hydraulic braking force and a motor braking force).

The integrated controller 10 is configured to manage the energy consumption of a vehicle such that the vehicle can be driven with maximum efficiency. The integrated controller 10 receives information from a motor RPM sensor 21 for detecting the number of revolutions Nm of the motor, a second clutch output RPM sensor 22 for detecting the number of revolutions $N2_{out}$ of the second clutch, and a second clutch torque sensor 23 for detecting a torque TCL2 of the second clutch.

The integrated controller 10 controls the operation of the engine E in response to a control command from the engine controller 1, the operation of the motor/generator MG in response to a control command from the motor controller 2, the engagement/release of the first clutch CL1 in response to a control command from the first clutch controller 5, and the engagement/release of the second clutch CL2 in response to a control command from the automatic transmission clutch controller 7.

Figure 2:
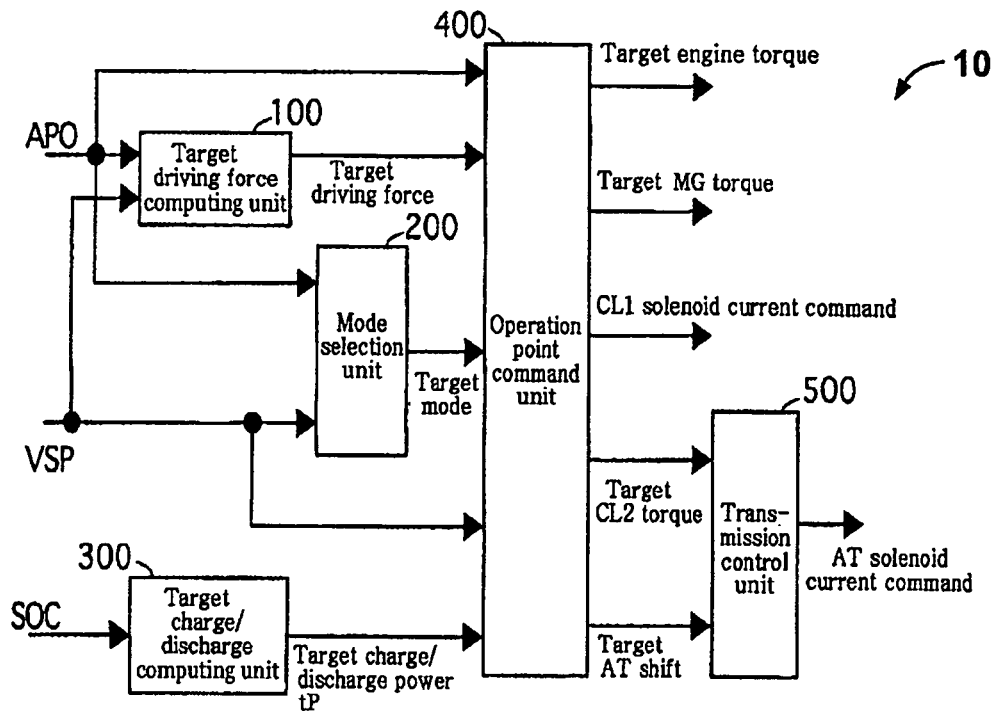
FIG. 2 is a block diagram illustrating an integrated controller with a computer program and including various functional or computing units according to one or more embodiments of the present invention.

A computing process performed in the integrated controller 10 according to one or more embodiments of the present invention will now be described with reference to FIG. 2. For example, the integrated controller may 10 repeatedly execute the computing process at a control period of 10 msec. The integrated controller 10 includes a target driving force computing unit 100, a mode selection unit 200, a target charge/discharge computing unit 300, an operation point command unit 400 and a transmission control unit 500.

Figure 3:
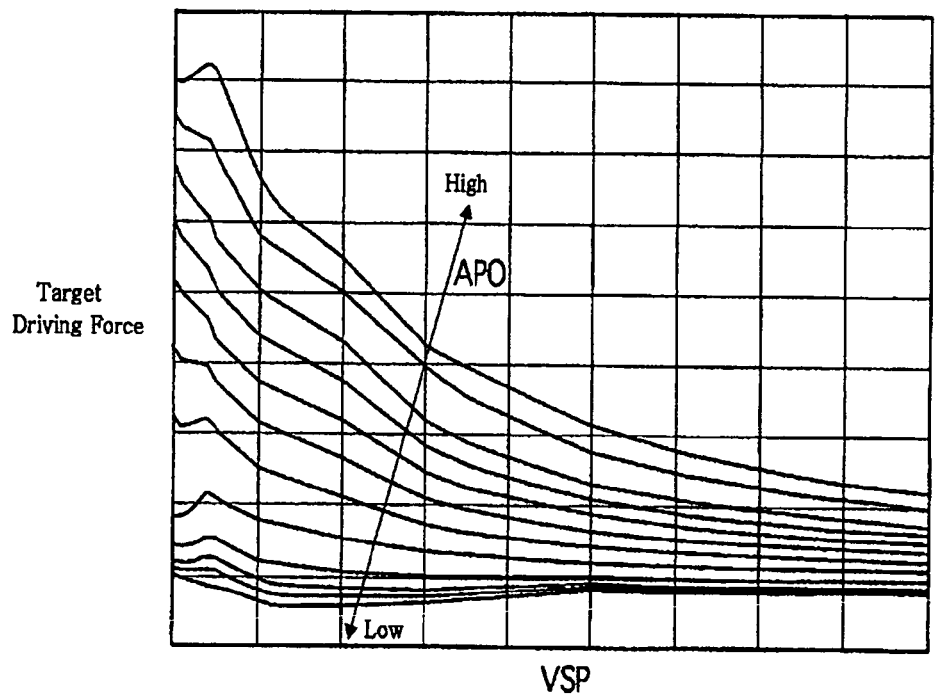
FIG. 3 illustrates an example of a target driving force map used for target driving force calculation in the target driving force computing unit shown in FIG. 2.

The target driving force computing unit 100 computes a target driving force tFo0 based on the accelerator opening APO as well as the vehicle speed VSP by using a target driving force map as depicted, for example, in FIG. 3.

Figure 4:
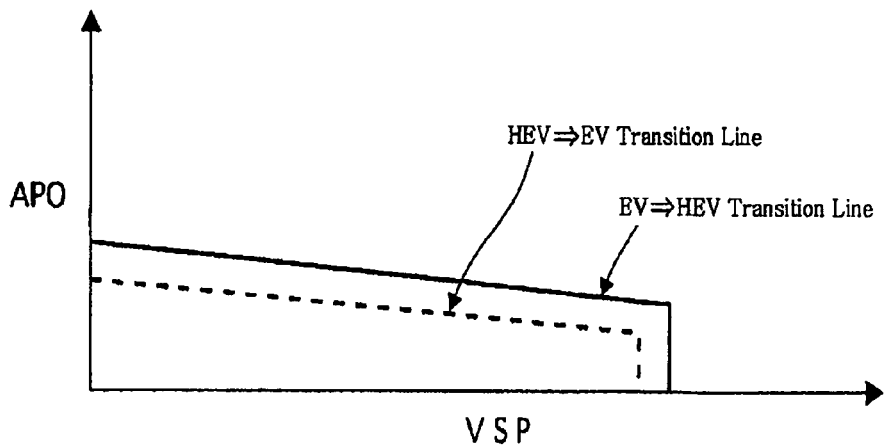
FIG. 4 shows an example of a target mode map used for target mode selection in a mode selection unit shown in FIG. 2.

The mode selection unit 200 computes a target mode based on the accelerator opening APO and the vehicle speed VSP by using an EV-HEV selecting map as depicted, for example, in FIG. 4. If the battery SOC is less than a reference value, then the mode selection unit 200 selects the HEV mode as the target mode.

Figure 5:
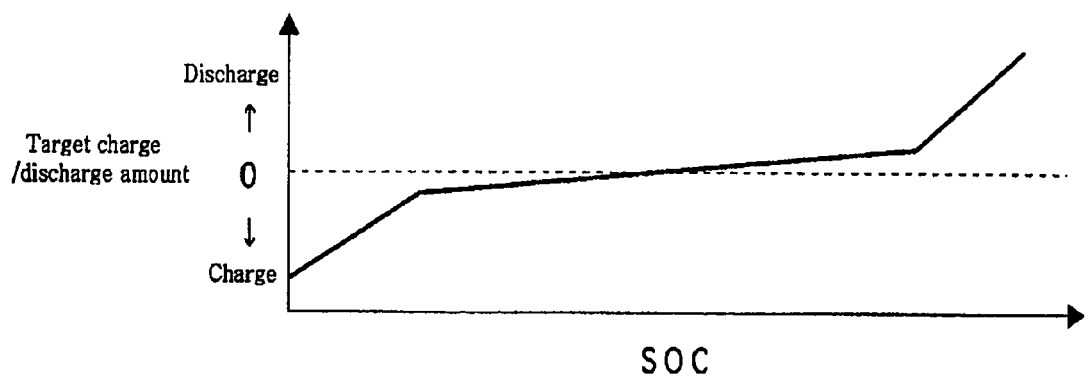
FIG. 5 shows an example of a target charge/discharge amount map used for target charge/discharge power computation in a target charge/discharge computing unit shown in FIG. 2.

The target charge/discharge computing unit 300 computes a target charge/discharge power tP based on the battery SOC by using a target charge/discharge map as depicted, for example, in FIG. 5.

The operation point command unit 400 computes an excessive target engine torque, target motor/generator torque, target second clutch torque capacity, target transmission gear ratio and first clutch solenoid current command based on the accelerator opening APO, target driving force tFo0, target mode, vehicle speed VSP and target charge/discharge power tP. The target transmission gear ratio is calculated based on the accelerator opening APO and the vehicle speed VSP by using a shift schedule as depicted, for example, in FIG. 6.

The transmission control unit 500 controls the operation of a solenoid valve in the automatic transmission to achieve the target second clutch torque capacity and the target transmission gear ratio.

[Coasting Deceleration Control System]

Figure 7:
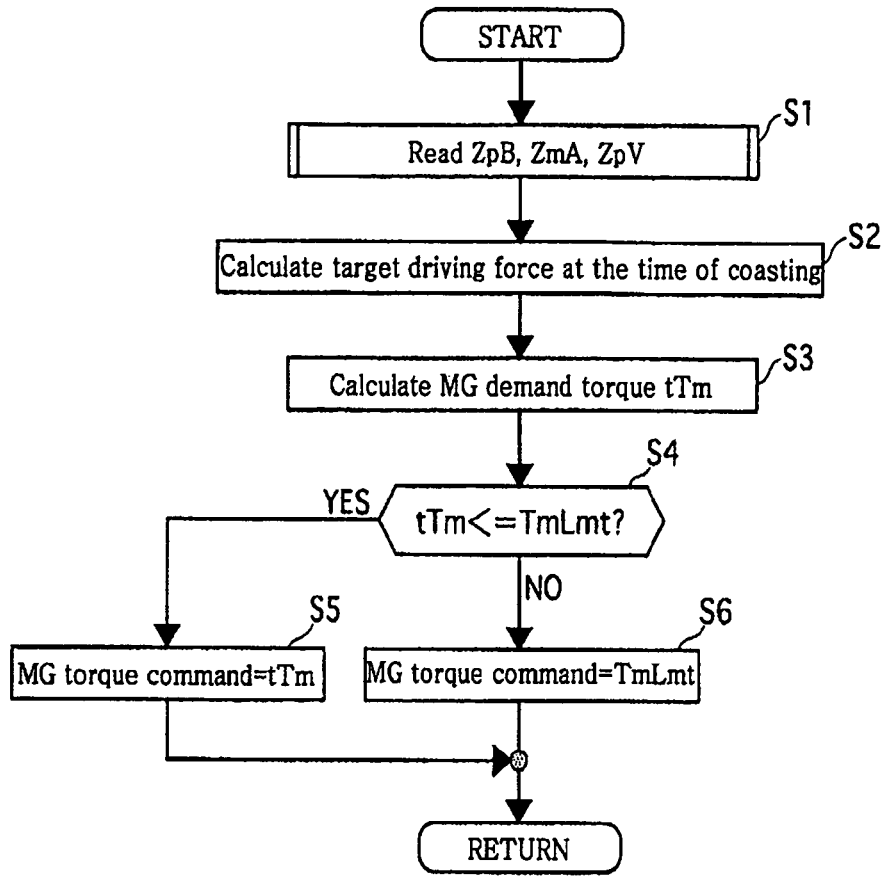
FIG. 7 is a flow chart showing a coasting deceleration control process performed in an integrated controller according to one or more embodiments of the present invention.

FIG. 7 is a flow chart showing a coasting deceleration control process according to one or more embodiments of the present invention. The coasting deceleration control process is performed in the integrated controller 10.

In step S1, a coasting deceleration increase correction factor ZpB and a coasting deceleration decrease correction factor ZmA are read. The coasting deceleration increase correction factor ZpB and the coasting deceleration decrease correction factor ZmA are calculated using a calculating process which is discussed below with reference to FIG. 9. At the same time, a coasting deceleration increase correction factor ZpV is read. The coasting deceleration increase correction factor ZpV is calculated using a calculating process which is discussed below with reference to FIG. 13.

Figure 8:
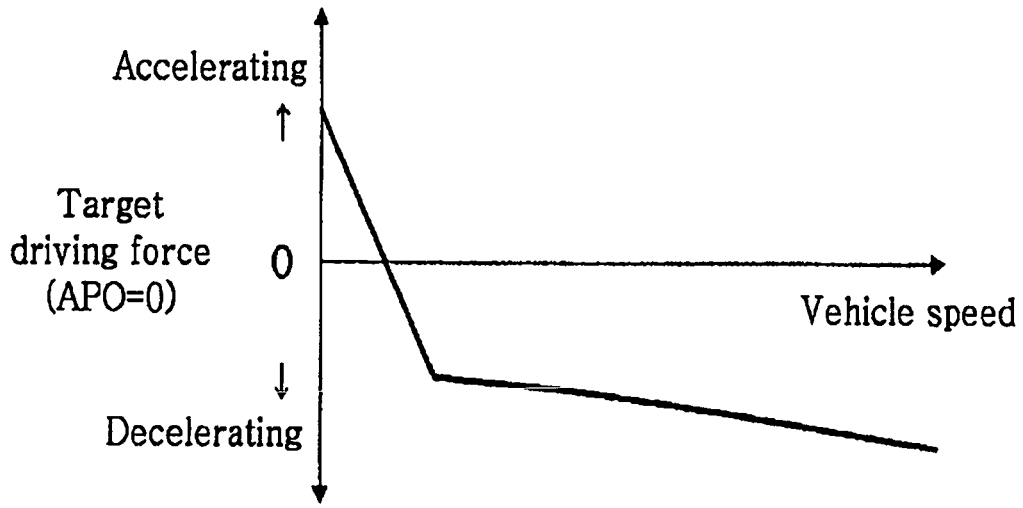
FIG. 8 shows an example of a characteristic of target driving force at the time of releasing an accelerator that is used for coasting deceleration control according to one or more embodiments of the present invention.

In step S2, the target driving force at the time of coasting is calculated. The term "at the time of coasting" in the context of this application refers to a point of time during which the vehicle is coasting. If the accelerator opening APO is zero (APO=0), the target driving force can be calculated, for example, using the target driving force and vehicle speed relationship shown in FIG. 8. The target driving force is multiplied by the coasting deceleration correction factors ZpB, ZmA and ZpV, respectively. The product that most correctly reflects the level of driver's demand for controlling the amount of deceleration, for example a value obtained by multiplying the target driving force calculated using the relationship in FIG. 8 by the correction factor furthest from 1, is selected. The selected value is set as the target driving force at the time of coasting. This step corresponds to a target driving force computation process at the time of coasting. As shown in FIG. 8, when the accelerator opening APO is zero (APO=0), the target driving force may be reduced significantly as the vehicle speed is increased. Steps S1 and S2 correspond to a target coasting deceleration computing process for determining a level of the driver's demand for controlling the deceleration at the time of coasting accompanied by the accelerator releasing operation, and sets the target coasting deceleration to a larger value as the level of driver demand for deceleration becomes higher.

Figure 6:
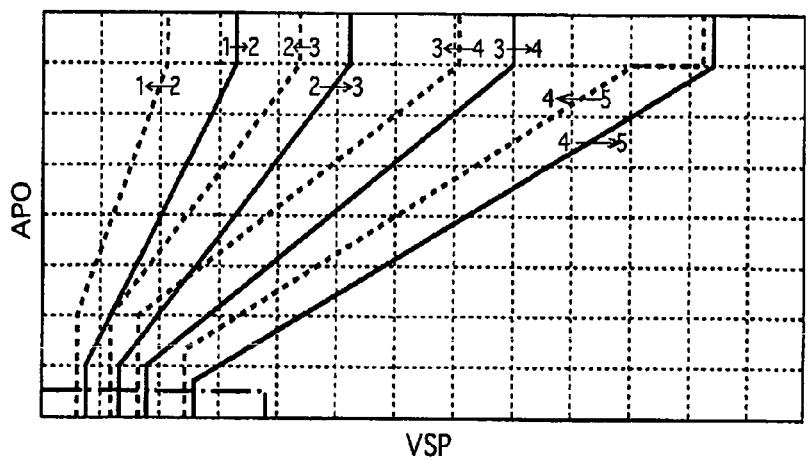
FIG. 6 illustrates an example of a shift schedule used for target transmission gear ratio computation in an operation point command unit shown in FIG. 2.

In step S3, a motor/generator demand torque tTm is calculated by using the target driving force at the time of coasting and the transmission gear ratio of the shift stage, which is selected based on the shift schedule as depicted, for example, in FIG. 6. Step 3 corresponds to a motor/generator demand torque calculating process. In the "EV mode," since only the motor/generator MG serves as a driving source, the motor/generator demand torque tTm is calculated based on the target driving force at the time of coasting and the transmission gear ratio. In the "HEV mode," since both the engine E and the motor/generator MG can be driving sources, the motor/generator demand torque tTm is calculated based on the target driving force at the time of coasting, the transmission gear ratio and the engine driving force at the time of coasting.

In step S4, it is determined whether the motor/generator demand torque tTm is equal to or less than a motor/generator torque limit value TmLmt (tTm≦TmLmt). The motor/generator torque limit value TmLmt is determined based on the battery SOC and a temperature of the motor/generator. When any one of the battery SOC and the temperature of the motor/generator is high, the motor/generator demand toque tTm may become restricted. If tTm≦TmLmt, then the process proceeds to step S5. Otherwise, the process proceeds to step S6.

In step S5, the motor/generator demand torque tTm calculated in step S3 is set as a motor/generator torque command. The process is then completed ("return" step).

On the other hand, if it is determined that tTm>TmLmt in step S4, then the process proceeds to step S6, wherein the motor/generator torque limit value TmLmt is set as a motor/generator torque command. The process is then completed. Here, steps S4, S5, and S6 correspond to a motor/generator output process for determining the motor/generator demand torque tTm while setting the motor/generator torque limit value TmLmt as an upper limit value, and outputting the motor/generator torque command corresponding to the motor/generator demand torque to the motor/generator MG.

Figure 9:
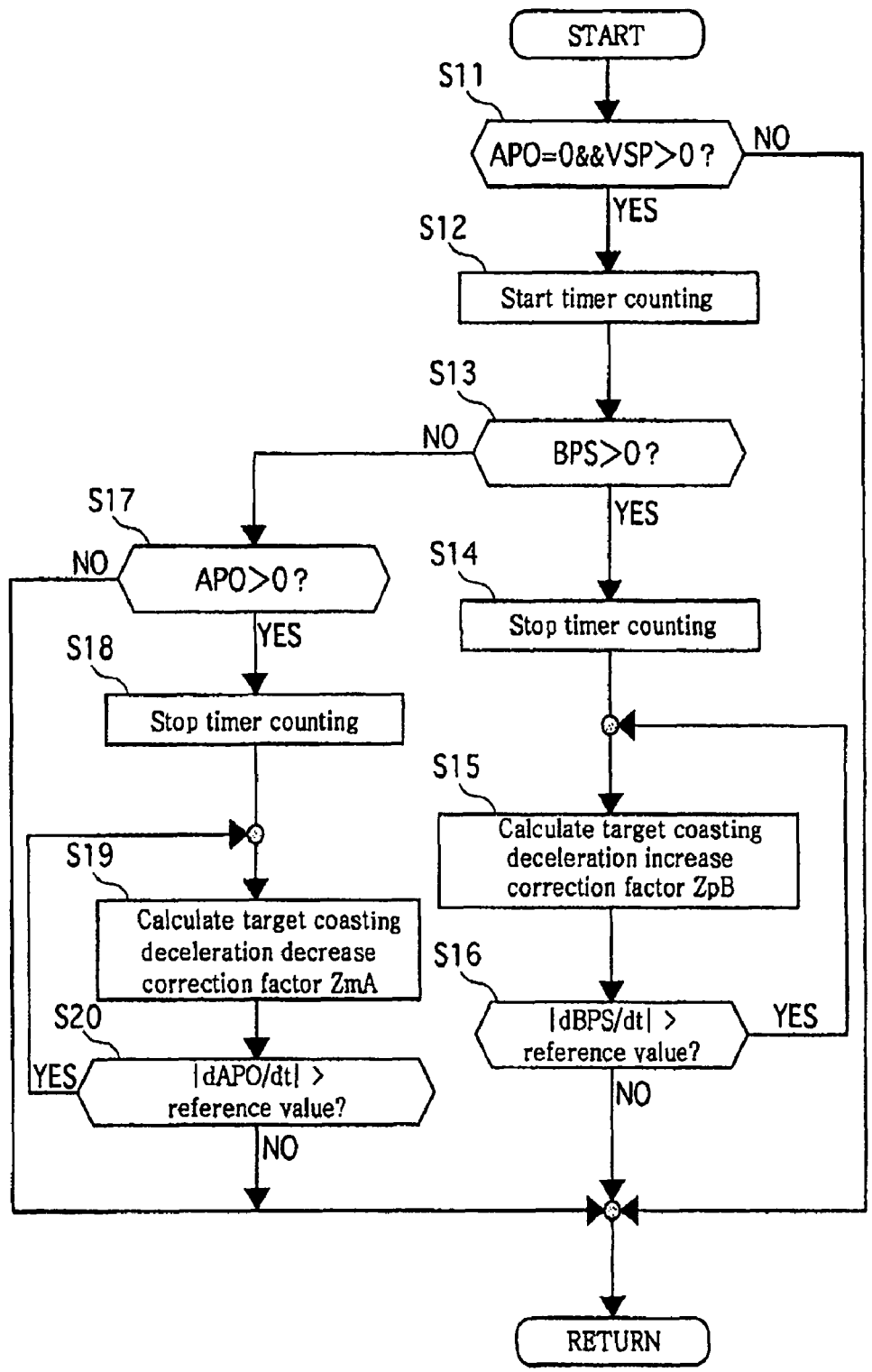
FIG. 9 is a flow chart showing a computing process that includes calculation of target coasting deceleration increase correction factor ZpB and target coasting deceleration decrease correction factor ZmA used for coasting deceleration control according to one or more embodiments of the present invention.

FIG. 9 presents a flow chart showing a process of calculating the coasting deceleration increase correction factor ZpB and the coasting deceleration decrease correction factor ZmA in the coasting deceleration control that is performed in the integrated controller 10, according to one or more embodiments of the present invention. This process corresponds to a coasting deceleration correction factor calculating process.

In step S11, it is determined whether the accelerator opening APO is zero (APO=0), and whether the vehicle speed VSP is greater than zero (VSP>0). If APO=0 and VSP>0, then the process proceeds to step 12. Otherwise, the process is completed ("return" step). In other words, in step S11, it is determined whether the vehicle is in a coasting state accompanied by an accelerator releasing operation, and whether the vehicle is in a state of driving that requires speed reduction.

In step S12, a timer starts to count time.

In step S13, it is determined whether a brake hydraulic pressure BPS, corresponding to a brake depressing force, is greater than zero (BPS>0). If BPS>0, then the process proceeds to step S14. Otherwise, the process proceeds to step S17.

In step S14, the timer stops counting. The count value of the timer is stored, and the timer is reset.

Figure 10:
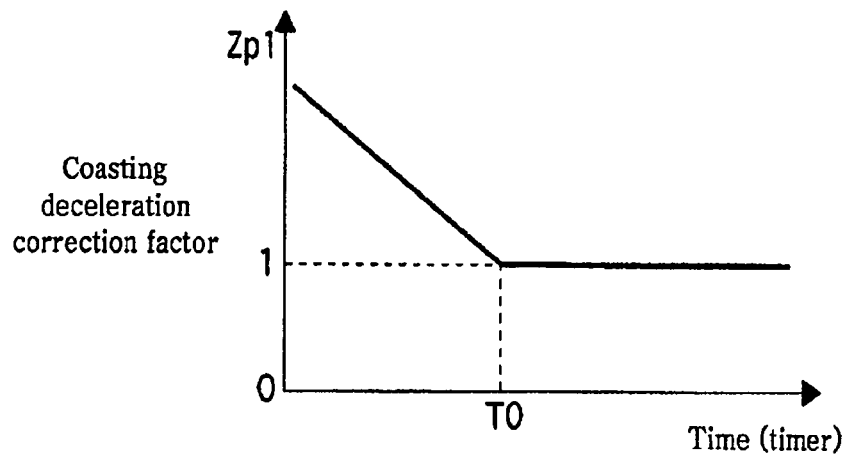
FIG. 10 shows an example of a graph of coasting deceleration correction factor Zp1 with respect to time from a timer that may be used for coasting deceleration control according to one or more embodiments of the present invention, mapping.
Figure 11:
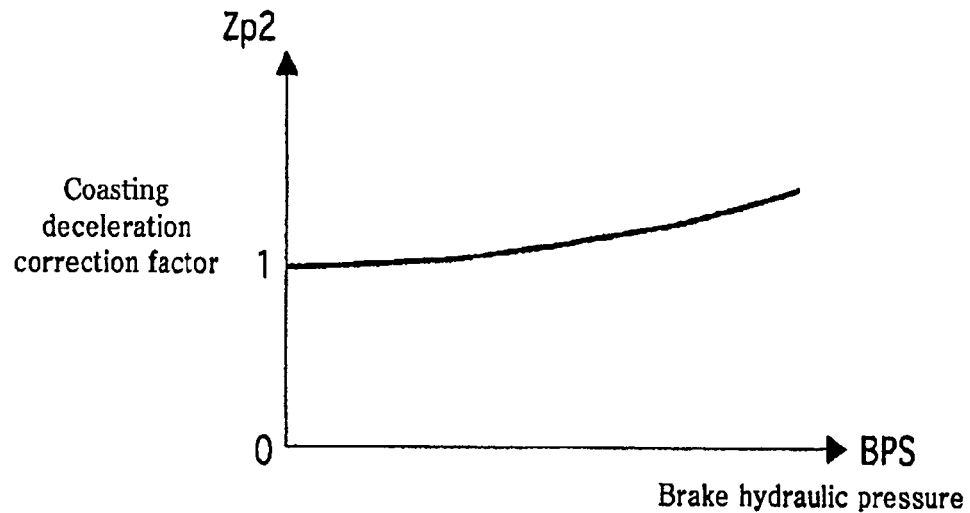
FIG. 11 shows an example of a map, of coasting deceleration correction factor Zp2 with respect to brake hydraulic pressure that may be used for coasting deceleration control according to one or more embodiments of the present invention.

In step S15, the target coasting deceleration increase correction factor ZpB is calculated. The target coasting deceleration increase correction factor ZpB is calculated by multiplying coasting deceleration correction factor Zp1 with coasting deceleration correction factor Zp2. The coasting deceleration correction factor Zp1 is determined based on the time counted by the timer (i.e., a period from an end of the accelerator releasing operation to a start of the brake depressing operation) in step 14 and a characteristic of the coasting deceleration correction factor as depicted, for example, in FIG. 10. In FIG. 10, when the time counted by the timer is greater than a reference time T0, the coasting deceleration correction factor Zp1 is set to 1 (Zp1=1). On the other hand, when the time counted by the timer is less than the reference time T0, the coasting deceleration correction factor Zp1 is greater than 1, and increases as the counted time becomes shorter. The coasting deceleration correction factor Zp2 is determined based on the brake hydraulic pressure BPS (corresponding to the brake depressing force) and a characteristic of the coasting deceleration correction factor as depicted in FIG. 11. Referring to FIG. 11, the coasting deceleration correction factor Zp2 increases as the brake hydraulic pressure BPS becomes higher.

In step S16, it is determined whether an absolute value |dBPS/dt| of a differential value dBPS/dt of the brake hydraulic pressure BPS is greater than a reference value (|dBPS/dt|>reference value). If |dBPS/dt|>reference value, then the process returns to step S15. Otherwise, the process is completed. In one or more embodiments of the present invention, the brake operation may be stopped depending on whether the reference value is greater than the differential absolute value |dBPS/dt| of the brake hydraulic pressure BPS. If the differential absolute value |dBPS/dt| of the brake hydraulic pressure BPS is greater than the reference value (|dBPS/dt|>reference value), then the brake starts or continues to operate and process returns to step S15, wherein the target coasting deceleration increase correction factor ZpB is recalculated.

In step S17, if it is found that BPS≦0 in step S13, then it is determined whether the accelerator opening APO is greater than zero (APO>0). If APO>0, then the process proceeds to step S18. Otherwise, the process is completed.

In step S18, the timer stops counting time. The time counted by the timer is stored and the timer is reset.

Figure 12:
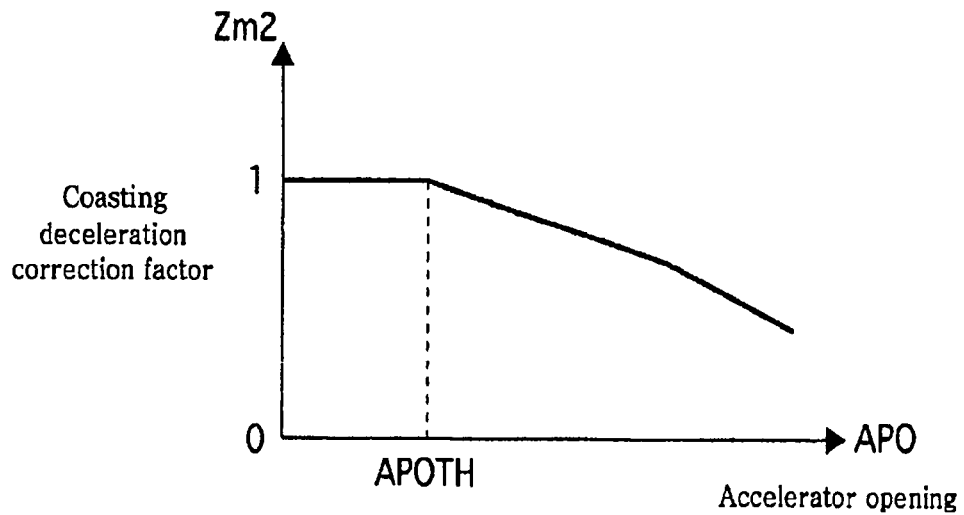
FIG. 12 shows an example of a graph, of coasting deceleration correction factor Zm2 with respect to accelerator opening that may be used for coasting deceleration control according to one or more embodiments of the present invention.

In step S19, the target coasting deceleration decrease correction factor ZmA is calculated. The target coasting deceleration decrease correction factor ZmA is calculated by multiplying coasting deceleration correction factor Zm1 by coasting deceleration correction factor Zm2. A coasting deceleration correction factor Zp1 is determined based on the time counted by the timer in step S18 and the characteristic of the coasting deceleration correction factor as depicted, for example, in FIG. 10. The coasting deceleration correction factor Zm1 is an inverse number of Zp1. The coasting deceleration correction factor Zm2 is determined based on the accelerator opening APO and the characteristic of the coasting deceleration correction factor as depicted, for example, in FIG. 12. In FIG. 12, the coasting deceleration correction factor Zm2 is set to 1 (Zm2=1) until the accelerator opening APO becomes a reference opening APOTH. Here, when the accelerator opening APO exceeds the reference opening APOTH, the coasting deceleration correction factor Zm2 is decreased from 1 as the accelerator opening APO becomes larger.

In step S20, it is determined whether an absolute value |dAPO/dt| of a differential value dAPO/dt of the accelerator opening APO is greater than a reference value (|dAPO/dt|>reference value). If |dAPO/dt|>reference value, then the process returns to step S19. Otherwise, the process is completed. Here, the accelerator operation may be stopped depending on whether or not the reference value is greater than the differential absolute value |dAPO/dt| of the accelerator opening APO. If the differential absolute value |dAPO/dt| of the accelerator opening APO is greater than the reference value (|dAPO/dt|>reference value), then the accelerator starts or continues to operate and the target coasting deceleration decrease correction factor ZmA is recalculated in step S19.

Figure 13:
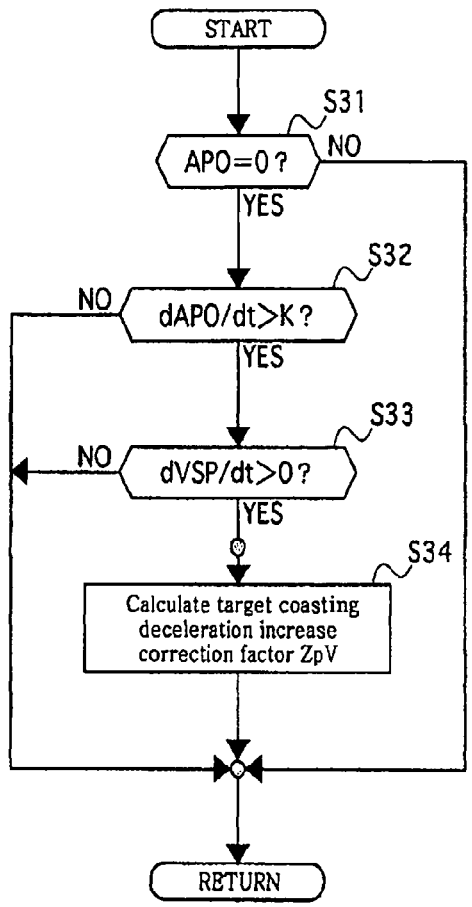
FIG. 13 is a flow chart showing a computing process, including calculation of target coasting deceleration increase correction factor ZpV that may be used for coasting deceleration control according to one or more embodiments of the present invention.

FIG. 13 is a flow chart showing a process of calculating the coasting deceleration increase correction factor ZpV in the coasting deceleration control that is performed in the integrated controller 10 according to the one or more embodiments of the present invention. This process corresponds to a coasting deceleration correction factor calculating process.

In step S31, it is determined whether the accelerator opening APO is zero (APO=0). If APO=0, then the process proceeds to step S32. Otherwise, the process is completed ("return" step).

In step S32, an accelerator opening speed dAPO/dt is calculated, and it is determined whether the accelerator opening speed dAPO/dt is greater than a reference value K (dAPO/dt>K). If dAPO/dt>K, then the process proceeds to step S33. Otherwise, the process is completed.

In step S33, it is determined whether a differential value dVSP/dt of the vehicle speed VSP, which corresponds to acceleration of the vehicle, is greater than zero (dVSP/dt>0). If dVSP/dt>0, then the process proceeds to step S34. Otherwise, the process is completed.

Figure 14:
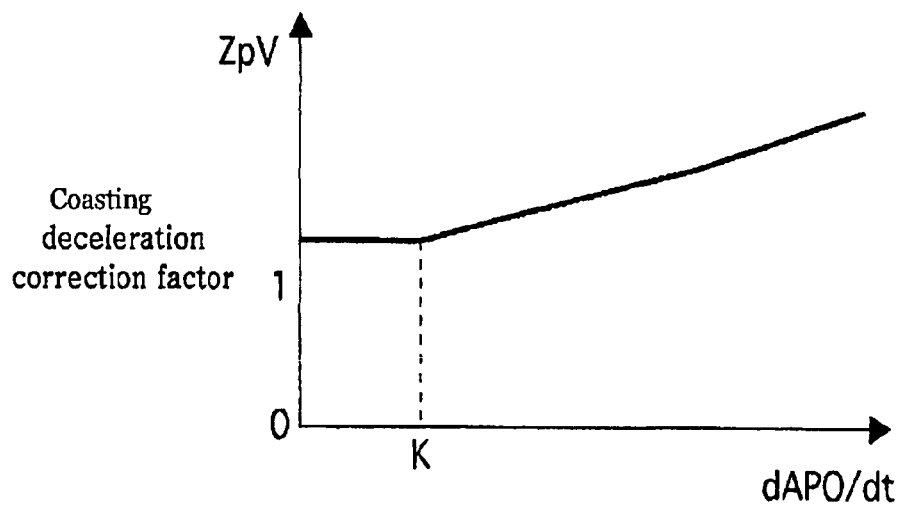
FIG. 14 shows an example of a graph, of coasting deceleration correction factor ZpV with respect to differential value of accelerator opening that may be used for coasting deceleration control according to one or more embodiments of the present invention.

In step S34, the target coasting deceleration increase correction factor ZpV is determined based on the accelerator opening speed dAPO/dt and a characteristic of the coasting deceleration correction factor as depicted, for example, in FIG. 14. Here, as shown in FIG. 14, when the accelerator opening speed dAPO/dt is greater than the reference value K, as the accelerator opening speed dAPO/dt becomes higher, it is determined that the driver intends to decelerate quickly, and ZpV becomes a larger value (greater than 1). Then, the process is completed.

The operation of coasting deceleration control will now be discussed.

[Operation of Coasting Deceleration Control]

A vehicle equipped with CVT (Continuously Variable Transmission) can detect the driver's intent to decelerate quickly and change the transmission gear ratio of the CVT, thereby approximating the actual coasting deceleration to a level desired by the driver.

However, it is difficult to adjust the coasting deceleration in a wide range only by controlling a transmission input RPM through changing the transmission gear ratio. Thus, when a target transmission gear ratio exceeds an allowable transmission gear ratio (a threshold value), regardless of the level of driver's demand for deceleration, it is difficult to achieve the level of deceleration that the driver desires.

In the coasting deceleration control device according to one or more embodiments of the present invention, it is determined at the time of coasting whether the driver's demand for deceleration is strong or weak. As the level of driver's demand for deceleration becomes higher, a value of the target coasting deceleration determined by the coasting deceleration control device becomes larger. Further, the coasting deceleration control device may perform a target coasting deceleration adjusting process, which adjusts the target coasting deceleration through the motor/generator torque control. At the time of coasting accompanied by the accelerator releasing operation, the coasting deceleration control device adjusts the coasting deceleration according to the level of driver's demand for deceleration, thereby improving the driving performance.

In other words, at the time of coasting accompanied by the accelerator releasing operation, the coasting deceleration of the vehicle is determined univocally based on a magnitude of the brake torque of the driving system, which is generated based on a difference between an input torque from the driving wheels and a torque of an output shaft of the transmission. However, since such coasting deceleration does not reflect the level of driver's demand for deceleration, which can be recognized by inspecting the driver's operation of the accelerator or brake, the coasting deceleration needs to be adjusted according to the level of the driver's demand for deceleration.

For example, a vehicle equipped with CVT can adjust the coasting deceleration caused by the engine friction through changing the transmission gear ratio of the CVT. However, since the only difference between the transmission gear ratio at the time of coasting and the upper or lower limit transmission gear ratio is the output shaft torque adjusting value of the transmission, the coasting deceleration is adjusted within a restricted range.

A hybrid vehicle equipped with a motor/generator MG in a driving system according to one or more embodiments of the present invention uses a degree of freedom for controlling the motor/generator torque that can be adjusted in a wide rage. Further, an optimal control response can be obtained. In the "EV mode", the coasting deceleration is entirely adjusted by the motor/generator torque control. In the "HEV mode," a range of the coasting deceleration adjusting value (except a portion corresponding to the engine torque) is adjusted by the motor/generator torque control. Accordingly, the coasting deceleration can be adjusted according to the level of driver's demand for deceleration.

As a result, at the time of coasting accompanied by the accelerator releasing operation, by adjusting the coasting deceleration differently depending on the level of driver's demand for deceleration (e.g., when stopping the vehicle with the brake operation, decelerating the vehicle with the intent of reacceleration, or temporarily decelerating the vehicle during the acceleration), the vehicle speed can be reduced according to the driver's intention, thereby improving the driving performance.

In a coasting deceleration control device according to one or more embodiments of the present invention, the target coasting deceleration computing process includes the coasting deceleration correction factor calculating process (FIGS. 9 and 13), which calculates the coasting deceleration correction factor based on a parameter representing the driver's intention of deceleration. Such a computing process also includes the target driving force computation process for calculating the target driving force at the time of coasting by multiplying the coasting deceleration correction factor by the target driving force when the accelerator is released. Further, the coasting deceleration control device performs the motor/generator demand torque calculating process (step S3) for calculating the motor/generator demand torque tTm based on the target driving force at the time of coasting and the transmission gear ratio of the automatic transmission AT. The coasting deceleration control device also performs the motor/generator output process (steps S4, S5, and S6) for determining the motor/generator demand torque tTm while setting the motor/generator torque limit value TmLmt as the upper limit value and outputting the motor/generator torque command corresponding to the derived motor/generator demand torque to the motor/generator MG. Thus, the target coasting deceleration can be easily computed by separately calculating the target driving force at the time of coasting and the coasting deceleration correction factor. The motor/generator torque limit value TmLmt is used in determining the motor/generator demand torque tTm by the coasting deceleration control.

The coasting deceleration control device according to one or more embodiments of the present invention may be used in a hybrid vehicle equipped with a hybrid driving system, which includes the engine E, first clutch CL1, motor/generator MG, automatic transmission AT, and driving wheels RL and RR. The driving mode of such hybrid vehicle includes the "HEV mode" in which the first clutch CL1 is engaged and both the engine E and motor/generator MG are driven as a power source. It also includes the "EV mode" in which the first clutch CL1 is released and only the motor/generator MG is driven as a power source. In the "EV mode," the coasting deceleration is entirely adjusted by the motor/generator torque control. In the "HEV mode," a range of the coasting deceleration adjusting value (except a portion corresponding to the engine torque) is adjusted through the motor/generator torque control.

Accordingly, at the time of coasting accompanied by the accelerator releasing operation, the coasting deceleration can be adjusted according to the level of driver's demand for deceleration, thereby improving the driving performance.

[Coasting Deceleration Control in Vehicle Stop Accompanied by Brake Operation]

When the vehicle is decelerated while driving at a constant speed by releasing the accelerator and pressing on the brake, a process (during a period from the end of the accelerator releasing operation to the start of the brake depressing operation) is performed by repeatedly executing a sequence of steps, i.e., step S11→step S12→step S13→step S17→return, as shown in the flow chart of FIG. 9. When the brake depressing operation is started, a process is preformed in the following order: step S11→step S12→step S13→step S14→step S15→step S16 (as shown in the flow chart of FIG. 9). While the brake is being depressed, a process is repeatedly performed by executing a sequence of steps, i.e., step S15→step S16.

Therefore, in step S15, the coasting deceleration correction factor Zp1 is determined based on the time counted by the timer (a period from the end of the accelerator releasing operation to the start of the brake depressing operation) and the characteristic of the coasting deceleration correction factor, as depicted, for example, in FIG. 10. The coasting deceleration correction factor Zp2 is determined based on the brake hydraulic pressure BPS (corresponding to the brake depressing force) and the characteristic of the coasting deceleration correction factor, as depicted, for example, in FIG. 11. The target coasting deceleration increase correction factor ZpB is calculated by multiplying the coasting deceleration correction factor Zp1 by the coasting deceleration correction factor Zp2.

In other words, if the time period from the end of the accelerator releasing operation to the start of the brake depressing operation (the time counted by the timer) is less than the reference time T0, then it is determined that the driver intends to decelerate quickly. Further, as the time counted by the timer becomes shorter, the coasting deceleration correction factor Zp1 becomes greater, as depicted, for example, in FIG. 10. Further, as the brake hydraulic pressure BPS (corresponding to the brake depressing force) becomes higher, it is determined that the driver intends to decelerate quickly and the coasting deceleration correction factor Zp2 becomes greater, as depicted, for example, in FIG. 11.

Accordingly, in the operation of stopping the vehicle accompanied by the brake operation, a process is performed in the following order: step S1→step S2→step S3→step S4→step S5 (or step S6), as shown in the flow chart of FIG. 7. In step S2, based on the target coasting deceleration increase correction factor ZpB read in step S1, the coasting target driving force is adjusted to be lower than the target driving force at the time of releasing the accelerator. After step S3, the corrected coasting target driving force is acquired. In other words, the torque control of the motor/generator MG is performed to acquire the target coasting deceleration.

As a result, in the operation of stopping the vehicle accompanied by the brake operation, as the time period from the end of the accelerator releasing operation to the start of the brake depressing operation becomes shorter or as the brake depressing force becomes greater, it is determined that the driver intends to decelerate quickly. Further, the large coasting deceleration corresponding to the driver's intention is preformed through the motor/generator torque control, thereby stopping the vehicle at a target stopping position while decreasing the braking distance or reducing the load on operating the brake.

As described above, in the coasting deceleration correction factor calculating process (step S15) preformed by the coasting deceleration control device according to one or more embodiments of the present invention, if a time period from the end of the accelerator release to the start of the brake depression (the time counted by the timer) is less than the reference time T0, then it is determined that the driver intends to decelerate quickly. Further, as the time counted by the timer becomes shorter, the coasting deceleration correction factor Zp1 becomes larger. For example, in case the coasting deceleration is maintained constantly without being affected by the time period from the end of the accelerator releasing operation to the start of the brake depressing operation, although the driver depresses the brake immediately after releasing the accelerator with the intent of decelerating quickly, it is difficult to perform coasting deceleration quickly. Thus, the braking distance may be increased, which causes a deviation of the vehicle from a target stopping position, or the load on operating the brake may be increased. The coasting deceleration control device according to one or more embodiments of the present invention is configured such that when the driver depresses the brake immediately after releasing the accelerator with the intent of decelerating quickly, coasting deceleration is performed quickly to reduce the braking distance or the load on operating the brake, thereby securely stopping the vehicle at a target stopping position.

In the coasting deceleration correction factor calculating process (step S15) performed by the coasting deceleration control device according to one or more embodiments of the present invention, the brake hydraulic pressure BPS (corresponding to the brake depressing force) is detected. Further, as the brake hydraulic pressure BPS is increased, the coasting deceleration correction factor Zp2 becomes larger. For example, when the coasting deceleration is maintained constantly without being affected by the magnitude of brake depressing force, although the driver depresses the brake immediately after releasing the accelerator with the intent of decelerating quickly, it may be difficult to perform coasting deceleration quickly. Thus, the braking distance may be increased, which causes a deviation of the vehicle from a target stopping position, or the load on operating the brake may be increased. The coasting deceleration control device according to one or more embodiments of the present invention is configured such that when the driver strongly depresses the brake with the intent of quickly decelerating, coasting deceleration is performed quickly to reduce the braking distance or the load on operating the brake, thereby securely stopping the vehicle at a target stopping position.

[Coasting Deceleration Control in Deceleration Driving Having Reacceleration Demand]

When the vehicle is decelerated from a constant speed by releasing the accelerator, temporarily depressing the brake and re-depressing the accelerator (e.g., while driving on a curved road), a process during a period from the start of the accelerator releasing operation to the end of the brake depressing operation is performed by repeatedly executing a sequence of steps, i.e., step S11→step S12→step S13→step S17→return, as shown in the flow chart of FIG. 9. At the time of starting the brake depressing operation, a process is performed in the following order: step S11→step S12→step S13→step S14→step S15→step S16 (as shown in the flow chart of FIG. 9). Then, while the brake is being depressed, a process is performed by repeatedly executing step S15→step S16. Further, while releasing the brake, a process is performed in the following order: step S11→step S12→step S13→step S17→return (as shown in the flow chart of FIG. 9). At the time of starting the accelerator depressing operation, a process is performed in the following order: step S11→step S12→step S13→step S17→step S18→step S19→step S20 (as shown in the flow chart of FIG. 9). While the accelerator is being depressed, a process of step S19→step S20 is repeatedly performed.

Therefore, in step S19, the coasting deceleration correction factor Zp1 is determined based on the time counted by the timer (a time period from the end of the accelerator releasing operation to the start of the accelerator redepressing operation) and the characteristic of the coasting deceleration correction factor, as depicted in FIG. 10. The inverse number of the Zp1 is set to the coasting deceleration correction factor Zm1. Also, the coasting deceleration correction factor Zm2 is determined based on the accelerator opening APO and the characteristic of the coasting deceleration correction factor, as depicted in FIG. 12. The target coasting deceleration decrease correction factor ZmA is calculated by multiplying the coasting deceleration correction factor Zm1 by the coasting deceleration correction factor Zm2.

In other words, if the time period from the end of the accelerator release operation to the start of re-depressing the accelerator (the time counted by the timer) is less than the reference time T0, then it is determined that the driver intends to decelerate slowly. Accordingly, as the time counted by the timer becomes shorter, the coasting deceleration correction factor Zm1 becomes smaller (Zm1 is the inverse number of Zp1 in FIG. 10). While re-depressing the accelerator, the coasting deceleration correction factor Zm2 is set to 1 (Zm2=1) until the accelerator opening APO becomes the reference opening APOTH. If the accelerator opening APO exceeds the reference opening APOTH, then it is determined that the driver intends to decelerate slowly. Further, as the accelerator opening APO is increased, the coasting deceleration correction factor Zm2 becomes smaller (FIG. 12).

Accordingly, during a procedure of deceleration and subsequent reacceleration, a process is performed in the following order: step S1→step S2→step S3→step S4→step S5 (or step S16) (as shown in the flow chart of FIG. 7). In step S2, based on the target coasting deceleration increase correction factor ZmA read in step S1, the coasting target driving force is adjusted to be greater than the target driving force at the time of releasing the accelerator. After step S3, the motor/generator torque control is performed to acquire the adjusted coasting target driving force, i.e., the target coasting deceleration.

As a result, during a process of deceleration and subsequent reacceleration, if the accelerator is re-depressed after releasing the accelerator, by waiting until the accelerator opening APO reaches the reference opening APOTH thereby changing the correction factor, a desired level of deceleration can be acquired when the brake is depressed later. As the time period from the end of the accelerator releasing operation to the start of the accelerator re-depressing operation becomes shorter or as the accelerator opening APO is increased, it is determined that the driver intends to decelerate. Further, an amount of small coasting deceleration corresponding to the driver's intent is provided through the motor/generator torque control, thereby improving the reacceleration responsiveness and accelerating the vehicle to a desired speed in a short time while reducing the load on operating the accelerator.

As described above, in the coasting deceleration correction factor calculating process (step S19) performed by the coasting deceleration control device according to one or more embodiments of the present invention, when the brake is released after the brake depression and the accelerator opening APO exceeds the reference opening APOTH, the coasting deceleration correction factor Zm2 becomes smaller. For example, if the target coasting deceleration is changed during the brake depression, then there is a need to decrease a cooperative regenerative amount so that the vehicle deceleration is kept unchanged as well as to operate the hydraulic brake for speed reduction by the motor/generator torque. However, since the responsiveness of the hydraulic brake is slower than that of the motor/generator MG, the vehicle deceleration may be changed. One or more embodiments of the present invention is configured such that when the brake is released and the accelerator opening APO exceeds the reference opening APOTH, a desired level of vehicle deceleration can be acquired when the brake is depressed later since the target coasting deceleration is changed during acceleration.

In the coasting deceleration correction factor calculating process (step S19) performed by the coasting deceleration control device according to one or more embodiments of the present invention, if the time period from the end of the accelerator release to the start of the accelerator re-depression (the time counted by the timer) is less than the reference time T0, then it is determined that the driver intends to decelerate slowly. Further, as the time counted by the timer becomes shorter, the coasting deceleration correction factor Zm1 becomes smaller. For example, when the coasting deceleration is maintained at a constant rate without being affected by the time period from the end of the accelerator release to the start of the accelerator re-depression, although the driver re-depresses the accelerator immediately after releasing the accelerator with the intent of slowly decelerating, it is difficult to restrict the amount of the coasting deceleration within a small range. Thus, it may take time to accelerate the vehicle to a desired speed and the load of operating the accelerator may be increased. The coasting deceleration control device according to one or more embodiments of the present invention is configured such that as the time period from the end of the accelerator release to the start of the accelerator re-depression becomes shorter, the target coasting deceleration becomes smaller, thereby increasing the reacceleration responsiveness and accelerating the vehicle to a desired speed in a short time while reducing the load of operating the accelerator.

In the coasting deceleration correction factor calculating process (step S19) performed by the coasting deceleration control device according to one or more embodiments of the present invention, the accelerator opening APO at the time of re-depressing the accelerator is detected. Further, as the accelerator opening APO becomes larger, the coasting deceleration correction factor Zm2 becomes smaller. For example, in case the coasting deceleration is maintained constantly without being affected by the magnitude of the accelerator opening at the time of re-depressing the accelerator, it is difficult to restrict the amount of the coasting deceleration within a small range, although the driver strongly re-depresses the accelerator with the intent of slowly decelerating. Thus, it may take time to accelerate the vehicle to a desired speed and the load of operating the accelerator may be increased. The coasting deceleration control device according to the one or more embodiments of the present invention is configured such that as the accelerator opening APO at the time of re-depressing the accelerator is increased, the target coasting deceleration becomes smaller, thereby increasing the reacceleration responsiveness and accelerating the vehicle to a desired speed in a short time while reducing the load of operating the accelerator.

[Coasting Deceleration Control in Temporary Deceleration during Acceleration Driving]

When of temporarily decelerating the vehicle by quickly releasing the accelerator e.g., while driving on a curved road), a process is conducted in the following order: step S31→step S32→step S33→step S34 (as shown in the flow chart of FIG. 13). In step S34, the target coasting deceleration increase correction factor ZpV is determined based on the accelerator opening speed dAPO/dt and the characteristic of the coasting deceleration correction factor, as depicted, for example, in FIG. 14.

As a result, when the accelerator opening speed dAPO/dt exceeds the reference value K and the vehicle is in a state of acceleration, as the accelerator opening speed APO/dt becomes greater, it is determined that the driver intends to intensively perform the target deceleration. Accordingly, a large amount of coasting deceleration corresponding to the driver's intent is acquired by the motor/generator torque control. Therefore, for example, even while driving on a curved road, a high cornering stability an be achieved by decelerating the vehicle without operating the brake.

As described above, in the coasting deceleration correction factor calculating unit step S34) of the coasting deceleration control device according to one or more embodiments of the present invention, when the accelerator opening speed dAPO/dt exceeds the reference value K and the vehicle is in a state of acceleration, it is determined that the driver intends to decelerate rapidly. Also, as the accelerator opening speed dAPO/dt is increased, the coasting deceleration increase correction factor ZpV becomes larger. For example, when the coasting deceleration is maintained constantly without being affected by the magnitude of the accelerator opening speed, it is difficult to obtain a large amount of coasting deceleration, although the driver quickly releases the accelerator. Thus, while driving on a curved road, performing only the accelerator releasing operation in an acceleration driving state does not sufficiently slow the vehicle. As such, the vehicle may deviate from a target driving trajectory or the driver needs to operate the brake to secure a sufficient speed reduction. The coasting deceleration control device according to one or more embodiments of the present invention is configured such that the driver's intent of intensively performing the target deceleration is reflected in the accelerator opening speed dAPO/dt, thereby acquiring a large amount of coasting deceleration.

Therefore, in the process of deceleration stop, the braking distance may be decreased without increasing the load of operating the brake. Further, even while driving on a curved road, high cornering stability can be achieved by reducing the vehicle speed without operating the brake.

A coasting deceleration control device according to one or more embodiments of the present invention may have one or more of the following advantages:

(1) In the vehicle equipped with the driving system including the motor/generator MG and the automatic transmission AT, at the time of coasting accompanied by the accelerator releasing operation, it is determined whether the level of driver's demand for deceleration is strong or weak. By employing the target coasting deceleration computing process (steps S1 and S2) that sets the target coasting deceleration to a larger value as the driver's demand for deceleration becomes stronger and the coasting deceleration control process (steps S3, S4, S5, and S6) that adjusts the target coasting deceleration calculated by the target coasting deceleration computing process through the motor/generator torque control, the coasting deceleration can be adjusted appropriately according to the level of driver's demand for deceleration, thereby improving the driving performance.

(2) The target coasting deceleration computing process includes the coasting deceleration correction factor calculating process (FIGS. 9 and 13) that calculates the coasting deceleration correction factor based on the parameter showing the driver's intent of demanding deceleration and the target driving force computation process (step S2) that calculates the target driving force at the time of coasting by multiplying the coasting deceleration correction factor by the target driving force when the accelerator is released. The coasting deceleration control process includes the motor/generator demand torque calculating process (step S3) that calculates the motor/generator demand torque tTm based on the target driving force at the time of coasting and the transmission gear ratio of the automatic transmission AT. The coasting deceleration control process also includes the motor/generator output process (steps S4, S5, and S6) that generates the motor/generator demand torque tTm while restricting the upper limit value by the motor/generator torque limit value TmLmt and outputs the motor/generator torque command corresponding to the generated motor/generator demand torque to the motor/generator MG. Therefore, the target coasting deceleration can be easily computed by separately calculating the target driving force at the time of coasting and the coasting deceleration correction factor. Further, motor/generator torque limit value TmLmt is taken into account in generating the motor/generator demand torque tTm through the coasting deceleration control.

(3) In the coasting deceleration correction factor calculating process (step S15), if the time period from the end of accelerator release to start of brake depression (time counted by the timer) is less than the reference time T0, then it is determined that the driver intends to decelerate rapidly. Further, as the time counted by the timer becomes shorter, the coasting deceleration correction factor Zp1 becomes larger. Therefore, when the driver depresses the brake immediately after releasing the accelerator with the intent of decelerating quickly, a large amount of coasting deceleration is provided to reduce the braking distance or the load of operating the brake, thereby securely stopping the vehicle at a target stopping position.

(4) In the coasting deceleration correction factor calculating process (step S15), the brake hydraulic pressure BPS (corresponding to the brake depressing force) is detected. Also, as the brake hydraulic pressure BPS is increased, the coasting deceleration correction factor Zp2 becomes larger. When the driver strongly depresses the brake with the intent of decelerating very quickly, a large coasting deceleration is provided to reduce the braking distance or the load of operating the brake, thereby securely stopping the vehicle at a target stopping position.

(5) In the coasting deceleration correction factor calculating process (step S19), when the brake is released after brake depression and the accelerator opening APO exceeds the reference opening APOTH, the coasting deceleration correction factor Zm2 becomes smaller. Thus, since the target coasting deceleration is changed during the acceleration, a desired level of vehicle deceleration can be acquired when the brake is depressed later.

(6) In the coasting deceleration correction factor calculating process (step S19), if the time period from the end of accelerator release to the start of accelerator re-depression (the time counted by the timer) is less than the reference time T0, then it is determined that the driver intends to slowly decelerate. As the time counted by the timer becomes shorter, the coasting deceleration correction factor Zm1 becomes smaller, thereby increasing the reacceleration responsiveness and accelerating the vehicle to a desired speed in a short time while reducing the load of operating the accelerator.

(7) In the coasting deceleration correction factor calculating process (step S19), the accelerator opening APO at a time of re-depressing the accelerator is detected. As the accelerator opening APO becomes larger, the coasting deceleration correction factor Zm2 becomes smaller, thereby increasing the reacceleration responsiveness and accelerating the vehicle to a desired speed in a short time while reducing the load of operating the accelerator.

(8) In the coasting deceleration correction factor calculating process (step S34), when the accelerator opening speed dAPO/dt exceeds the reference value K and the vehicle is in a state of acceleration, it is determined that the driver intends to decelerate quickly. Further, as the accelerator opening speed dAPO/dt becomes higher, the coasting deceleration increase correction factor ZpV becomes larger. Therefore, in the process of a deceleration stop, the braking distance can be decreased without increasing the load of operating the brake. Further, even while driving on a curved road, a desired cornering stability can be achieved by reducing the vehicle speed without operating the brake.

(9) The coasting deceleration control device having a configuration as described above may be employed in a hybrid vehicle equipped with a hybrid driving system that includes an engine E, first clutch CL1, motor/generator MG, automatic transmission AT, and driving wheels RL and RR. The driving mode includes a "HEV mode" in which the first clutch CL1 is engaged and both the engine E and the motor/generator MG are driven as a power source. It also includes an "EV mode" in which the first clutch CL1 is released and only the motor/generator MG is driven as a power source. In the "EV mode," the coasting deceleration is entirely adjusted by the motor/generator torque control. In the "HEV mode," a range of the coasting deceleration adjusting value (except a portion corresponding to the engine torque) is adjusted by the motor/generator torque control. Accordingly, at the time of coasting accompanied by the accelerator releasing operation, the coasting deceleration can be adjusted according to the level of driver's demand for deceleration, thereby improving the driving performance.

In one or more embodiments of the present invention, the CVT may be used as the transmission. A coasting deceleration control is performed in such a way that when the motor/generator torque command is restricted by the torque limit value, a shortage of the driving force is compensated by controlling the transmission gear ratio of the CVT.

In a driving system of a hybrid vehicle according to one or more embodiments of the present invention, the CVT (e.g., belt-type CVT, toroidal-type CVT, etc.) is used at the transmission.

Figure 15:
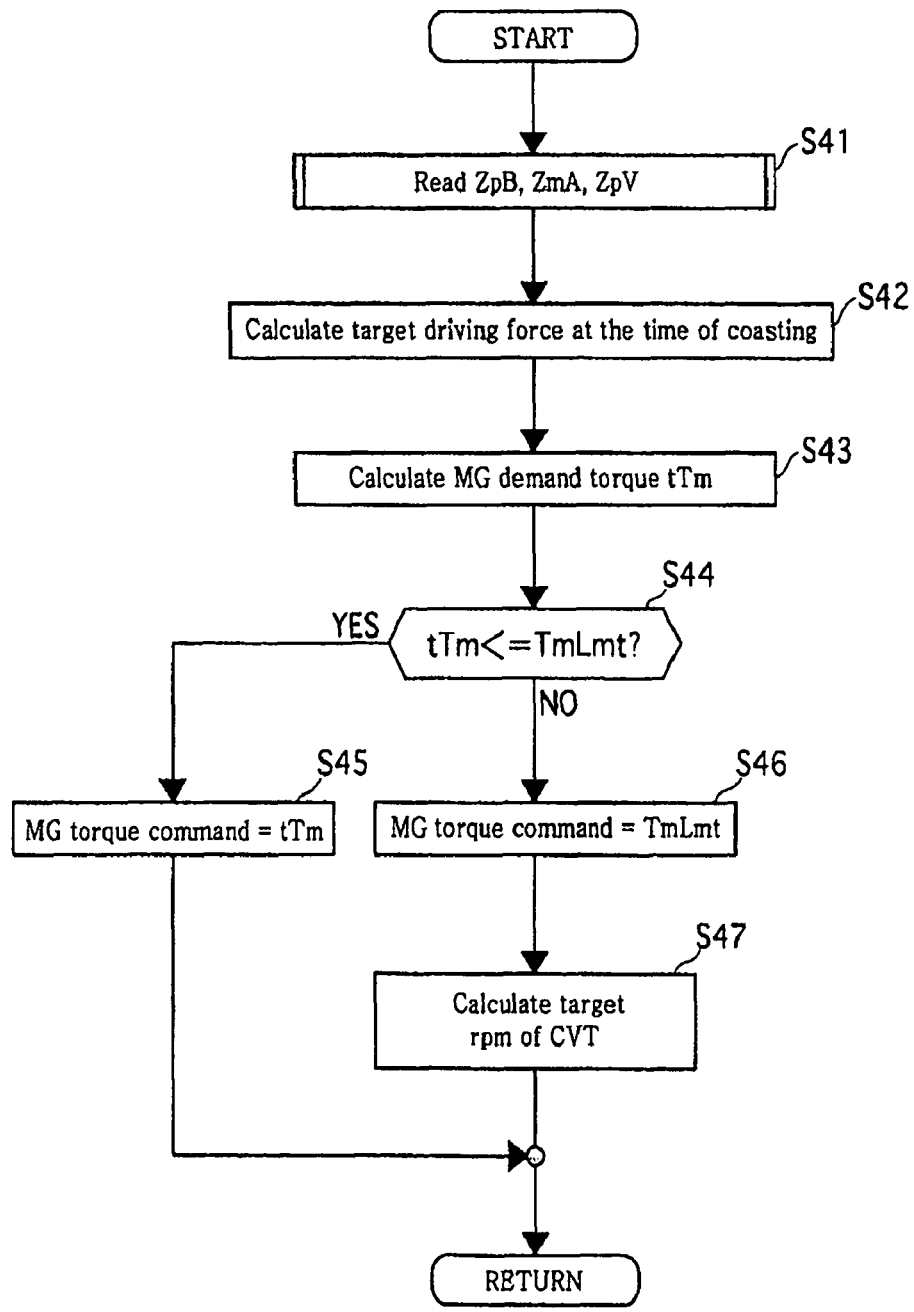
FIG. 15 is a flow chart showing a coasting deceleration control process performed in an integrated controller according to one or more embodiments of the present invention.

FIG. 15 is a flow chart showing a coasting deceleration control process performed in the integrated controller 10 (the coasting deceleration control unit) according to one or more embodiments of the present invention. Since steps S41 to S46 of FIG. 15 correspond to steps S1 to S6 in FIG. 7, respectively, a detailed explanation thereof will be omitted herein.

After performing step S46 in which the motor/generator torque limit value TmLmt is set as the motor/generator torque command (MG torque command=TmLmt), the process proceeds to step S47. In step S47, since the driving force falls short of an amount corresponding to a difference between the motor/generator demand torque tTm and the motor/generator torque limit value TmLmt (tTm−TmLmt), a transmission gear ratio is calculated for compensating a shortage of the driving force. Further, a transmission input RPM for achieving the calculated transmission gear ratio is set as a target RPM (a CVT output process). The process is then completed (return step).

In the coasting deceleration control device according to one or more embodiments of the present invention, a process is conducted in the following order: step S41→step S42→step S43, as shown in the flow chart of FIG. 15. In step S43, the motor/generator demand torque tTm is calculated. In step S44, if it is determined that the motor/generator demand torque tTm exceeds the motor/generator torque limit value TmLmt, then the process proceeds to step S46. In step S46, the motor/generator torque limit value TmLmt is set as the motor/generator torque command (MG torque command=TmLmt). In step S47, the transmission gear ratio is calculated for compensating the shortage of the driving force corresponding to a difference between the motor/generator demand torque tTm and the motor/generator torque limit value TmLmt (tTm−TmLmt). Further, the transmission input RPM for achieving the calculated transmission gear ratio is set to be the target RPM.

As discussed above, the coasting deceleration control device may be equipped with a CVT as the transmission according to one or more embodiments of the present invention. Further, the coasting deceleration control unit includes the motor/generator demand torque calculating process (step S43) that calculates the motor/generator demand torque tTm based on the target driving force at the time of coasting and the transmission gear ratio of the CVT. Also, the coasting deceleration control device may perform the motor/generator output process (step S46) that outputs the motor/generator torque command (i.e., the motor/generator torque limit value TmLmt) to the motor/generator MG if the motor/generator demand torque tTm exceeds the motor/generator torque limit value TmLmt. The coasting deceleration control device may further perform the CVT output process (step S47) that calculates the transmission gear ratio for compensating the shortage of the driving force corresponding to a difference between the motor/generator demand torque tTm and the motor/generator torque limit value TmLmt (tTm−TmLmt) and outputs to the CVT a command of setting the transmission input RPM for achieving the calculated transmission gear ratio as the target RPM. For example, in some embodiments, when the motor/generator torque is restricted by the battery SOC or the increase in temperature of the motor/generator system, if the motor/generator demand torque tTm exceeds the motor/generator torque limit value TmLmt, then a desired level of coasting deceleration may not be acquired. On the other hand, in one or more embodiments of the present invention, the shortage of the driving force corresponding to "tTm−TmLmt" is compensated by controlling the transmission gear ratio of the CVT. Thus, although the motor/generator demand torque tTm exceeds the motor/generator torque limit value TmLmt, a desired level of coasting deceleration can be securely acquired.

Further to the advantages previously discussed, one or more embodiments of the present invention may have one or more of the following advantages:

(10) In one or more embodiments of the present invention, the CVT may be used as a transmission. Further, the coasting deceleration control device may perform the motor/generator demand torque calculating process (step S43) that calculates the motor/generator demand torque tTm based on the target driving force at the time of coasting and the transmission gear ratio of the CVT. It may also perform the motor/generator output process (steps S46) that outputs the motor/generator torque command (i.e., the motor/generator torque limit value TmLmt) to the motor/generator MG if the motor/generator demand torque tTm exceeds the motor/generator torque limit value TmLmt. The coasting deceleration control device may further perform the CVT output process (step S47) that calculates the transmission gear ratio for compensating the shortage of the driving force corresponding to a difference between the motor/generator demand torque tTm and the motor/generator torque limit value TmLmt (tTm−TmLmt) and outputs to the CVT the command of setting the transmission input RPM for achieving the calculated transmission gear ratio as the target RPM. Accordingly, in the coasting deceleration control by the motor/generator torque, although the motor/generator demand torque tTm exceeds the motor/generator torque limit value TmLmt, a desired level of coasting deceleration may be securely acquired.

The coasting deceleration control device for a vehicle according to one or more embodiments of the present invention may be implemented in other specific forms without departing from the spirit or scope of the invention. It should be understood that the above-described embodiments are to be considered in all respects only as illustrative and not restrictive. The scope of the invention is, therefore, indicated by the appended claims, rather than by the foregoing description. All variations coming within equivalent meaning and range of the claims are to be embraced within their scope.

In one or more embodiments of the present invention, the target coasting deceleration computing process includes the coasting deceleration correction factor calculating process and the target driving force computation method to calculate the target driving force at the time of coasting corresponding to the target coasting deceleration. The coasting deceleration control device may perform the motor/generator demand torque calculating process and the motor/generator output process. In one or more embodiments of the present invention, the coasting deceleration control unit may perform the motor/generator demand torque calculating process, motor/generator output process and CVT output process. However, a detailed configuration of the target coasting deceleration computing process is not limited to those of the embodiments discussed above, as long as the process is configured so as to determine whether the driver's demand for deceleration is strong or weak at the time of coasting accompanied by the accelerator releasing operation and sets the target coasting deceleration to a larger value as the driver's demand for deceleration becomes stronger. Also, a detailed configuration of the coasting deceleration control device is not limited to those of the embodiments discussed above, as long as the device is configured so as to adjust the target coasting deceleration calculated through the motor/generator torque control by the target coasting deceleration computing process.

Although the embodiments of the present invention have been discussed being applied to a rear-wheel drive hybrid vehicle, the present invention may be applied to a front-wheel drive hybrid vehicle or a 4-wheel drive hybrid vehicle. Further, embodiments of the present invention may be applied to an electric vehicle or a fuel cell vehicle. Further, embodiments of the present invention may be applied to a vehicle equipped with a manually-operated or an actuator-operated transmission (i.e., manual transmission, automatic MT, etc.) as well as the automatic transmission and the CVT. Thus, the present invention can be applied to a vehicle having a driving system, which includes a motor/generator and a transmission.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle coasting deceleration control system comprising:
   a motor/generator arranged in a drive-train of a vehicle, and
   a controller configured to determine a driver demand for deceleration of the vehicle at a time of coasting accompanied by an accelerator releasing operation, the controller further configured to control the motor/generator to decelerate the vehicle responsive to the driver demand; and
   a program executable on the coasting deceleration control device for performing:
      a target coasting deceleration computing process for determining a driver demand regarding a level of deceleration at a time of coasting accompanied by an accelerator releasing operation,
      wherein the target coasting deceleration computing process calculates a target coasting deceleration,
      wherein the target coasting deceleration increases as the driver demand regarding a level of performing deceleration is stronger, and
      the target coasting deceleration computing process comprises:
         a coasting deceleration correction factor calculating process for calculating a coasting deceleration correction factor based on a parameter indicating driver demand for an amount of deceleration, and
         a target driving force calculating process for calculating a target driving force at the time of coasting by multiplying the coasting deceleration correction factor by a target driving force at the a time of accelerator release,
      wherein the driver demand is determined by the time period between a releasing of an accelerator by the driver and an applying of brakes of the vehicle by the driver.

2. The vehicle coasting deceleration control system of claim 1, wherein
   a target coasting deceleration is calculated to be larger as a level of the driver demand is stronger, and
   the controller is further configured to control the motor/generator to decelerate the vehicle based on the target coasting deceleration.

3. The vehicle coasting deceleration control system of claim 2, further comprising:
   a transmission arranged in a drive-train of the vehicle, and wherein
   the controller is further configured to control a transmission gear ratio and the motor/generator to decelerate the vehicle responsive to the target coasting deceleration.

4. A coasting deceleration control device for use in a vehicle of a type operated by a driver and having a driving system including an engine with an engine operating speed, a transmission having a variable gear ratio, and a motor/generator having adjustable torque in the driving system, the coasting deceleration control device comprising:
   a sensor for sensing a releasing of an accelerator by the driver;
   a controller operatively configured in the driving system with executable steps for:
      computing a driver demand for deceleration based upon the time between the sensing of a releasing of the accelerator by the driver and a sensing of an application of brakes of the vehicle by the driver,
      computing a target coasting deceleration based upon the computed driver demand for deceleration, wherein computing the target coasting deceleration comprises:
         a coasting deceleration correction factor calculating process for calculating a coasting deceleration correction factor based on a parameter indicating driver demand for an amount of deceleration, and
         a target driving force calculating process for calculating a target driving force at the time of coasting by multiplying the coasting deceleration correction factor by a target driving force at the a time of accelerator release, and
      controlling the variable gear ratio of the transmission and the adjustable torque of the motor/generator in response to the computing of the target coasting deceleration so that the vehicle obtains the computed target coasting deceleration.

5. A coasting deceleration control device for use in a driver operated vehicle having a driving system including an engine having an engine operating speed, a transmission having a variable gear ratio, and a motor/generator having adjustable torque in the driving system, the coasting deceleration control device comprising:
   a program executable on the coasting deceleration control device for computing:
      a driver demand for deceleration based upon the time between sensing a releasing of an accelerator by the driver and sensing an application of brakes of the vehicle by the driver, and
      a target coasting deceleration based upon the driver demand for deceleration that is detected, wherein computing the target coasting deceleration comprises:
         a coasting deceleration correction factor calculating process for calculating a coasting deceleration correction factor based on a parameter indicating driver demand for an amount of deceleration, and
         a target driving force calculating process for calculating a target driving force at the time of coasting by multiplying the coasting deceleration correction factor by a target driving force at the a time of accelerator release, and
   a driving system controller responsive to the program computed target coasting deceleration for selecting a gear ratio of the transmission, for adjusting the torque of the motor/generator, or for adjusting both the gear ratio of the transmission and the torque of the motor/generator so that the vehicle obtains the computed target coasting deceleration.

6. The coasting deceleration control device of claim 5, wherein;
computing the driver demand for deceleration comprises:
increasing a computed level of driver demand in response to shorter time periods between the releasing of the accelerator and the applying of the brakes, and
computing the target coasting deceleration comprises computing the target coasting deceleration based upon the computed level of driver demand, such that increased computed level of driver demand results in computing an increased target coasting deceleration.

7. The coasting deceleration control device of claim 6, wherein
the target coasting deceleration is repeatedly computed by the program based upon repeatedly sensing an engine speed and the transmission gear ratio during a time of coasting, repeatedly sensing accelerator release, breaking application, braking release, accelerator application and time periods between them, repeatedly computing the driver level of demand for deceleration; and
the driving system controller is responsive to the repeatedly computed target coasting deceleration for repeatedly selecting the gear ratio of the transmission and for repeatedly adjusting the torque of the motor/generator so that the vehicle obtains the repeatedly computed target coasting deceleration.

8. A coasting deceleration control device for a vehicle having a driving system including a motor/generator and a transmission, comprising:
a program executable on the coasting deceleration control device for performing:
a target coasting deceleration computing process for determining a driver demand regarding a level of deceleration at a time of coasting accompanied by an accelerator releasing operation,
wherein the target coasting deceleration computing process calculates a target coasting deceleration,
wherein the target coasting deceleration increases as the driver demand regarding a level of performing deceleration is stronger, and
the target coasting deceleration computing process comprises:
a coasting deceleration correction factor calculating process for calculating a coasting deceleration correction factor based on a parameter indicating driver demand for an amount of deceleration, and
a target driving force calculating process for calculating a target driving force at the time of coasting by multiplying the coasting deceleration correction factor by a target driving force at the a time of accelerator release; and
a coasting deceleration control process for adjusting the target coasting deceleration calculated by the target coasting deceleration computing process by controlling a torque of the motor/generator,
wherein the driver demand is determined by the time period between a releasing of an accelerator by the driver and an applying of brakes of the vehicle by the driver.

9. The coasting deceleration control device of claim 8, wherein
the target coasting deceleration computing process comprises a target driving force calculating process for calculating a target driving force at the time of coasting based on the driver demand for deceleration and the target driving force when the accelerator is released,
the coasting deceleration control process comprises a motor/generator torque calculating process for calculating a motor/generator torque based on the target driving force at the time of coasting and a gear ratio of the transmission, and
the coasting deceleration control process further comprises a motor/generator output process for deriving the motor/generator demand torque and outputting a motor/generator torque command corresponding to the derived motor/generator demand torque to the motor/generator.

10. The coasting deceleration control device of claim 9, wherein:
when a time elapsed after accelerator release until brake depression is less than a predetermined time, a coasting deceleration correction factor calculating process determines that the driver demand is to decelerate very quickly, and increases the coasting deceleration correction factor as the time elapsed after accelerator release until brake depression is shorter.

11. The coasting deceleration control device of claim 10, wherein the coasting deceleration correction factor calculating process detects a brake depressing force and increases the coasting deceleration correction factor as the brake depressing force increases.

12. The coasting deceleration control device of claim 10, wherein the coasting deceleration correction factor calculating process decreases the coasting deceleration correction factor when the brake is released after the brake depression and an accelerator opening exceeds a predetermined degree of opening.

13. The coasting deceleration control device of claim 9, wherein when a time elapsed after accelerator release until accelerator re-depression is less than a predetermined time, the coasting deceleration correction factor calculating process determines that driver demand is to decelerate slowly, and decreases the coasting deceleration correction factor as the time decreases.

14. The coasting deceleration control device of claim 13, wherein the coasting deceleration correction factor calculating process detects an accelerator opening at the time of accelerator re-depression and decreases the coasting deceleration correction factor as the accelerator opening increases.

15. The coasting deceleration control device of claim 9, wherein when an accelerator opening speed exceeds a reference value and the vehicle is in a state of acceleration, the coasting deceleration correction factor calculating process determines that the driver demand is to decelerate quickly, and increases the coasting deceleration correction factor as the accelerator opening speed increases.

16. The coasting deceleration control device of claim 8, wherein
the coasting deceleration control process comprises:
a motor/generator torque calculating process for calculating a torque of the motor/generator based on the target driving force at the time of coasting and a gear ratio of the transmission, and
a motor/generator output process for deriving the motor/generator torque and outputting a motor/generator torque command corresponding to the derived motor/generator torque to the motor/generator.

17. A hybrid vehicle equipped with a hybrid driving system comprising: an engine, a first clutch, a motor/generator, a transmission, and driving wheels, comprising the coasting deceleration control device of claim 8, wherein the vehicle has multiple driving modes, the multiple driving modes comprising:
- a HEV mode in which the first clutch is engaged and the engine and the motor/generator provide a driving force, and
- an EV mode in which the first clutch is released and the motor/generator provides the driving force.

18. The coasting deceleration control device of claim 17, wherein the transmission comprises a continuously variable transmission, and the coasting deceleration control process comprises:
- a motor/generator torque calculating process for calculating a motor/generator torque based on a target driving force at the time of coasting, and a gear ratio of the transmission;
- a motor/generator output process for outputting a motor/generator torque command corresponding to a motor/generator torque limit value to the motor/generator when the motor/generator torque exceeds the motor/generator torque limit value; and
- a continuously variable transmission output process for calculating a transmission gear ratio for compensating a shortage of a driving force corresponding to a difference between the motor/generator torque and the motor/generator torque limit value, the continuously variable transmission output process further being configured to output a command to the continuously variable transmission for setting a transmission input RPM to achieve the calculated transmission gear ratio as a target RPM.

19. The deceleration control device of claim 8, for a driver operated vehicle having a driving system further including an engine having an engine operating speed, the transmission having a variable gear ratio, and the motor/generator having adjustable torque in the driving system, the deceleration control device further comprising:
- the program executable on the deceleration control device for computing the target coasting deceleration also based upon the determined driver demand for deceleration, and
- the driving system controller responsive to the program computed target coasting deceleration for both selecting the gear ratio of the transmission and for adjusting the torque of the motor/generator so that the vehicle obtains the computed target deceleration.

20. A coasting deceleration control device for a driver operated vehicle having a driving system including a motor/generator and a transmission, comprising:
- a means for determining a driver deceleration demand at a time of coasting accompanied by an accelerator releasing operation;
  - a means for calculating a target coasting deceleration based upon the determined driver deceleration demand, wherein the calculated target coasting deceleration increases as the driver demand for deceleration is stronger, and wherein computing the target coasting deceleration comprises:
    - a coasting deceleration correction factor calculating process for calculating a coasting deceleration correction factor based on a parameter indicating driver demand for an amount of deceleration, and
    - a target driving force calculating process for calculating a target driving force at the time of coasting by multiplying the coasting deceleration correction factor by a target driving force at the a time of accelerator release; and
- a coasting deceleration control means for adjusting deceleration by controlling torque of the motor/generator to obtain the target coasting deceleration calculated by the target coasting deceleration computing process,
- wherein the driver deceleration demand is determined by the time period between a releasing of an accelerator by the driver and an applying of brakes of the vehicle by the driver.

21. A coasting deceleration control process for use in a vehicle having a driving system including an engine having an engine operating speed, a transmission having a variable gear ratio, and a motor/generator having adjustable torque in the driving system, the deceleration control device comprising:
- sensing a releasing of the accelerator by the driver;
- computing a driver demand for deceleration based upon the sensing of a releasing of the accelerator by the driver,
- computing a target coasting deceleration based upon the driver demand for deceleration that is computed, wherein computing the target coasting deceleration comprises:
  - a coasting deceleration correction factor calculating process for calculating a coasting deceleration correction factor based on a parameter indicating driver demand for an amount of deceleration, and
  - a target driving force calculating process for calculating a target driving force at the time of coasting by multiplying the coasting deceleration correction factor by a target driving force at the a time of accelerator release, and
- controlling the gear ratio of the transmission and the torque of the motor/generator in response to the computing of the target coasting deceleration so that the vehicle may obtains the computed target deceleration,
- wherein the driver demand is determined by the time period between a releasing of an accelerator by the driver and an applying of brakes of the vehicle by the driver.

* * * * *